United States Patent [19]

Yamamoto et al.

[11] 4,418,956

[45] Dec. 6, 1983

[54] EDGE TRIM AND WEATHER SEAL ASSEMBLY

[75] Inventors: Junji Yamamoto, Nogoya; Shingo Harada, Yokosuka, both of Japan

[73] Assignees: Aisin Seiki Kabushiki Kaisha, Kariya; Kanto Jidosha Kogyo Kabushiki Kaisha, Yokosuka, both of Japan

[21] Appl. No.: 227,932

[22] Filed: Jan. 23, 1981

[30] Foreign Application Priority Data

Jan. 24, 1980 [JP] Japan ........................... 55-7792[U]

[51] Int. Cl.³ ............................................. B60J 7/00
[52] U.S. Cl. .................................. 296/216; 296/218; 296/222; 52/823
[58] Field of Search ............... 296/216, 218, 222, 223, 296/224, 93; 52/716, 823 X; 49/501, 488

[56] References Cited

U.S. PATENT DOCUMENTS

| | | | |
|---|---|---|---|
| 3,214,879 | 11/1965 | Ellingson et al. | 49/488 |
| 3,851,432 | 12/1974 | Griffin | 52/217 |
| 4,219,231 | 8/1980 | Igel | 296/218 |
| 4,220,368 | 9/1980 | Ferrigan | 296/218 |
| 4,272,124 | 6/1981 | Schaltzler | 296/222 |

*Primary Examiner*—Robert R. Song
*Attorney, Agent, or Firm*—Finnegan, Henderson, Farabow, Garrett & Dunner

[57] ABSTRACT

An edge trim and weather seal assembly for a movable sun roof of a vehicle comprises an edge strip secured in use around an edge of a sun roof panel by means of a bonding agent, and a seal strip mounted on the edge strip to form a weather seal with the vehicle roof opening. The edge strip has top and bottom flanges overlying upper and lower edge portions of the sun roof panel and secured thereto by the bonding agent, and a recess or well portion in the bottom flange receives excess bonding agent and prevents its spillage out onto the exposed part of the sun roof panel. The seal strip has a locating edge portion for engaging the recess in the bottom flange of the edge trim to retain the seal strip on the edge trim.

4 Claims, 2 Drawing Figures

EDGE TRIM AND WEATHER SEAL ASSEMBLY

The present invention relates to edge trim and weather seal assemblies for movable sun roof panels of motor vehicles.

There have been proposed two types of sun roof panels. One is a completely detachable sun roof and the other is a slidable sun roof. In the detachable optionally power driven sun roof, it is known to mount the sun roof panel in the opening formed in the roof panel using a seal strip which seals and conceals the junction between the side edges of the detachable sun roof and the opening and is attached to an edge strip secured by adhesive around the side edge of the sun roof. Such an edge strip has a U-shaped channel defined between opposed upper and lower flanges so as to receive therebetween the side edge portion of the sun roof panel and an integral depending web portion extending therefrom. The edge strip is secured by a curable adhesive or bonding agent to the side edge of the sun roof panel. The conventional edge strip has disadvantages in that the bonding agent tends to flow out of the space between the opposed flanges of the edge strip and the upper and lower edge portions of the sun roof panel when the edge strip is secured to the side edge of the sun roof panel. Further, the conventional seal strip has disadvantages in that when the sun roof panel is moved to cover or uncover the opening formed in the vehicle roof the seal strip tends to be moved to a position in which it is no longer in tight contact with the edge strip, so that the sealing contact between the side edges of the sun roof panel and the opening may be lost.

It is a primary object of the present invention to provide an edge trim and weather seal assembly including an edge strip which will be adhesively secured to a side edge of a sun roof panel without any undesirable flow of a bonding agent outward of the edge strip and onto the vision area of the sun roof panel.

A further object of the present invention is to provide such an assembly including a seal strip which is firmly mounted on the edge strip to form a weather seal with the vehicle roof opening.

The invention provides an edge trim and weather seal assembly for a movable sun roof panel of a motor vehicle, comprising an edge strip for securing around an edge of the sun roof panel using a bonding agent, and a seal strip for mounting on the edge strip to form a weather seal with the vehicle roof opening, wherein the edge strip comprises upper and lower flanges for bonding to upper and lower edge portions of the sun roof panel, a well portion defined by a stepped portion of the lower flange for receiving excess bonding agent, and a depending web portion defining inside and outside walls of the edge strip; and wherein the seal strip has a locating edge portion for engagement with the side wall of the stepped portion of the edge strip for resisting movement of the seal strip relative to the edge strip.

The assembly of the invention may be adhesively secured to a side edge of a sun roof panel without any undesirable flow of the bonding agent from between the flanges onto the visible area of the sun roof panel, since the well portion in the edge strip receives and retains all excess bonding agent.

Another advantage of the assembly of the invention is that the seal strip remains in firm contact with the edge strip when the vehicle roof opening is repeatedly covered and uncovered; this is by virtue of the engagement between the anchorage portion of the seal strip and the inside wall of the edge strip. Preferably, the seal strip also has a locating edge engageable with a side wall of the stepped portion of the edge strip.

The above and other objects, advantages and features of the present invention will become apparent from the following description of a preferred embodiment of the present invention with reference to the accompanying drawings, in which.

Figure 1:
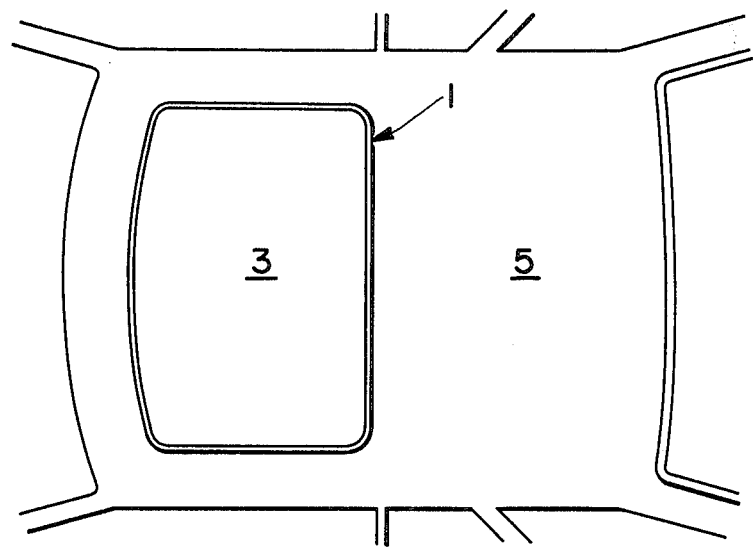
FIG. 1 is a plan view of the vehicle roof.
Figure 2:
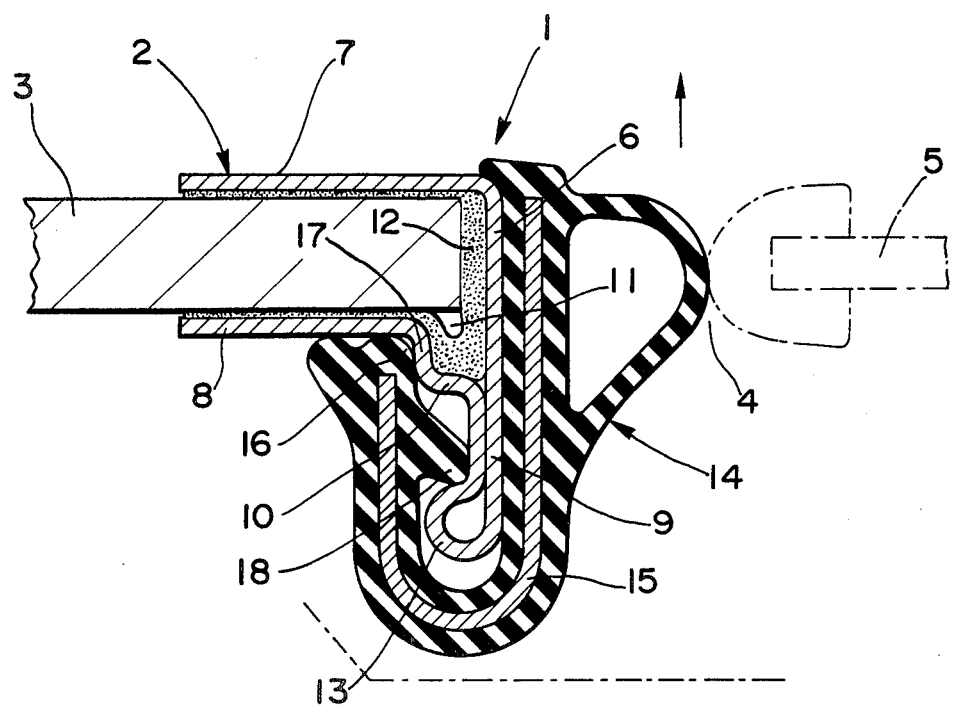
FIG. 2 is an enlarged cross-section through an embodiment of an edge trim and weather seal assembly for a vehicle sun roof panel according to the present invention.

Referring to FIGS. 1 and 2, the edge trim and weather seal assembly (1) includes an edge strip (2) adhesively secured around a side edge of a sun roof panel (3) which is detachably placed in an opening (4) formed in a vehicle roof (5), so that the opening (4) may be covered or uncovered by the sun roof panel (3). The edge strip (2) is preferably made of metal and comprises a substantially U-shaped channel portion (6) defined by opposed upper and lower flanges (7, 8) are bonded to the upper and lower edge portions of the sun roof (3) panel respectively, by means of a bonding agent (12). An integral web portion (9) of the edge strip (2) depends from the channel portion (6). The lower flange (8) is provided with a stepped portion (10) at the deepest part of the channel portion (6) to define a well portion (11) for receiving excess bonding agent (12) when it is coated on or poured along the internal surface of the U-shaped channel (6). Thus, when the side edge of the sun roof panel (3) is inserted into the U-shaped channel (6) of the edge strip (2) during assembly, the well portion (11) allows excess bonding agent (12) to flow therein so that the bonding agent does not flow out onto the visible area of the sun roof panel (3).

The edge strip (2) is provided with integral web portion (9) downwardly extending from the channel (6). The bottom edge of the web portion (9) is beaded by having formed therein a terminal hollow end (13) in which a pin may be inserted for secure connection of the adjacent mitered corners of the final assembly.

The assembly (1) further includes a seal strip (14) which has a generally U-shaped cross-section. The seal strip (14) is preferably made of a resilient material such as a synthetic rubber or rubber like material over a metal reinforcing core or plate (15) embedeed therein. The seal strip (14) assists in sealing and concealing the junction between the side edges of the sun roof panel (3) and the roof (5). The seal strip (14) is provided with a locating edge portion (16) engageable with a side wall (17) of the stepped portion (10) to resist movement of the seal strip (14) away from the edge strip (2) when the sun roof panel (3) is removed from the opening (4). The seal strip (14) is further provided with a longitudinal web or anchorage portion (18) engageable with the inside wall of the web (9) at its beaded lower edge (13) thereof, which assists in holding and positioning the seal strip (14) in its optimum position relative to the edge strip (2). The anchorage portion (18) of the seal strip (14) functions to prevent the seal strip (14) from being pulled down from the edge strip (2) when the opening (4) is covered or uncovered.

We claim:

1. An edge trim and weather seal assembly for a movable sun roof panel of a motor vehicle having a roof opening for receiving the panel, comprising:

(a) an edge strip adapted to be secured around the upper, lower and side edge portions of an edge of the sun roof panel using a bonding agent, said edge strip having upper and lower flanges for bonding to said upper and lower edge portions, respectively, said lower flange having a stepped portion defining a well for receiving excess bonding agent therein during mounting of said edge strip on said edge of the sun roof panel; and (b) a seal strip for mounting on said edge strip to form a weather seal with the roof opening when the panel is received therein, said seal strip having a locating edge portion for engagement with said stepped portion of said lower flange of said edge strip for resisting movement of said seal strip relative to said edge strip.

2. An edge trim and weather seal assembly as claimed in claim 1, wherein said stepped portion of said lower flange of said edge strip includes a depending side wall for said engagement with said locating edge portion of said seal strip.

3. An edge trim and weather seal assembly for a movable sun roof panel of a motor vehicle having a roof opening for receiving the panel, comprising:

(a) an edge strip adapted to be secured around the upper, lower and side edge portions of an edge of the sun roof panel using a bonding agent, said edge strip having upper and lower flanges for bonding to said upper and lower edge portions, respectively, said lower flange having a stepped portion defining a well for receiving excess bonding agent therein during mounting of said edge strip on said edge of the sun roof panel, said edge strip further comprising a web portion depending from said upper and lower flanges and defining inner and outer surfaces of said edge strip, with respect to said edge of the sun roof panel; and (b) a seal strip for mounting on said edge strip to form a weather seal with the roof opening when the panel is received therein, said seal strip having an anchorage portion for engagement with said inner surface of said web portion and a locating edge portion for engagement with said stepped portion of said lower flange of said edge strip for resisting movement of said seal strip relative to said edge strip.

4. An edge trim and weather seal assembly as claimed in claim 3, wherein said inner surface of said web portion of the edge strip has a bead-like terminal portion for said engagement with said anchorage portion of said seal strip.

* * * * *